(12) United States Patent
Sun et al.

(10) Patent No.: US 11,281,070 B2
(45) Date of Patent: Mar. 22, 2022

(54) HIGH-SPEED REAL-TIME SAMPLING AND MEASURING DEVICE AND METHOD FOR MID-INFRARED ULTRAFAST LIGHT SIGNAL

(71) Applicant: Xi'an Institute of Optics and Precision Mechanics of CAS, Shaanxi (CN)

(72) Inventors: Qibing Sun, Shaanxi (CN); Leiran Wang, Shaanxi (CN); Wenfu Zhang, Shaanxi (CN); Aihu Zheng, Shaanxi (CN); Chao Zeng, Shaanxi (CN); Wei Zhao, Shaanxi (CN)

(73) Assignee: Xi'an Institute of Optics and Precision Mechanics of CAS, Shaanxi (CN)

(*) Notice: Subject to any disclaimer, the term of this patent is extended or adjusted under 35 U.S.C. 154(b) by 211 days.

(21) Appl. No.: 16/700,810

(22) Filed: Dec. 2, 2019

(65) Prior Publication Data
US 2021/0088871 A1 Mar. 25, 2021

(30) Foreign Application Priority Data
Sep. 20, 2019 (CN) .......................... 201910890262.2

(51) Int. Cl.
*G02F 1/35* (2006.01)
*G02F 1/355* (2006.01)
*G02F 1/365* (2006.01)

(52) U.S. Cl.
CPC .......... *G02F 1/3534* (2013.01); *G02F 1/3501* (2013.01); *G02F 1/3544* (2013.01);
(Continued)

(58) Field of Classification Search
CPC .... G02F 1/3501; G02F 1/3503; G02F 1/3534; G02F 1/3544; G02F 1/3551; G02F 1/365; G02F 2202/20; G01J 11/00
See application file for complete search history.

(56) References Cited

U.S. PATENT DOCUMENTS 9,273,994 B2 * 3/2016 Zheng ........................ G01J 3/42
2008/0285606 A1 * 11/2008 Kippenberg .......... H04B 10/506
372/32

(Continued)

FOREIGN PATENT DOCUMENTS

CN 109813670 A * 5/2019 ............. G01N 21/35

*Primary Examiner* — Daniel Petkovsek
(74) *Attorney, Agent, or Firm* — Novick, Kim & Lee, PLLC; Allen Xue

(57) ABSTRACT

A device for high-speed real-time sampling of mid-infrared ultrafast light signals includes a time domain amplification unit and a detection unit. The time domain amplification unit is used to perform sampling and time domain amplification on signal light incident to the time domain amplification unit, and convert the signal light of a mid-infrared band into a near-infrared/visible band. The detection unit is used to receive and record information of the to-be-detected signal light processed by the time domain amplification unit to realize high-speed real-time sampling and measurement of the mid-infrared ultrafast light signal. The present disclosure can accurately obtain subpicosecond transient characteristics of the light signal, breaks through the capacity limit to the response rate of a traditional photoelectric detector, the bandwidth of the oscilloscope and the like, and is applicable to femtosecond-level mid-infrared ultrafast light signals.

5 Claims, 3 Drawing Sheets

(52) U.S. Cl.
CPC ............ *G02F 1/3551* (2013.01); *G02F 1/365* (2013.01); *G02F 1/3503* (2021.01); *G02F 2202/20* (2013.01)

(56) References Cited

U.S. PATENT DOCUMENTS

2012/0093519 A1* 4/2012 Lipson .................... G01J 11/00
398/157
2020/0378835 A1* 12/2020 Sun .......................... G01J 11/00

\* cited by examiner

HIGH-SPEED REAL-TIME SAMPLING AND MEASURING DEVICE AND METHOD FOR MID-INFRARED ULTRAFAST LIGHT SIGNAL

FIELD

The present disclosure belongs to the field of optical measurement, and relates to a high-speed real-time sampling and measuring device and method, and more particularly relates to a high-speed real-time sampling and measuring device and method for a mid-infrared ultrafast light signal based on time domain amplification.

BACKGROUND

A mid-infrared laser (3-5 μm band) has little loss when transmitted in the atmosphere, has very strong penetrating power to fog, smoke, etc., and is less affected by scattering of small suspended particles, absorption of gas molecules and the like, thus forming an extremely important atmospheric transparent window and covering the characteristic spectral lines of a large number of atoms and molecules. In view of this, researches on the laser of this band and application have always been important branches and research hotspots in the optical field. In recent years, with the continuous development of a laser technology, the mid-infrared ultrafast laser has become a powerful research tool and means in many scientific research fields, and has brought a huge positive impact on related scientific researches due to the fact that the width of the mid-infrared ultrafast laser has become narrower and narrower, from picoseconds to femtoseconds and even shorter, and the peak power of the mid-infrared ultrafast laser has become higher and higher, from the megawatt magnitude to the terawatt magnitude and even higher. Due to its unique characteristics and advantages, the mid-infrared laser has important application value and broad development prospect in fields of high-capacity high-speed telecommunications, molecular spectroscopy, environmental detection, medicine and military, and has attracted high concern and attention by scientific research personnel at home and abroad. For example, mid-infrared ultrashort pulses can be used to research the time-resolved spectra of many material structures. The use of the longer-wavelength mid-infrared ultrafast laser as pump light is favorable for generation of higher-order harmonic waves. Free-space optical communication using a mid-infrared light carrier experiences less loss than using a near-infrared light carrier. The mid-infrared molecular spectrum detection has higher sensitivity compared with a near-infrared band. However, most of detectors in the mid-infrared band at present need to work in a low-temperature environment in which the operating conditions, the noise environment, the response rate and the like are greatly limited, so that the detectors are not suitable for being applied in high-speed, real-time and low-noise occasions, cannot meet a detection requirement for a mid-infrared ultrafast light signal and greatly restrict the application and rapid development of a mid-infrared laser technology. Therefore, how to realize high-speed real-time sampling and measurement of the mid-infrared ultrafast light signal and improve the accuracy and reliability of a measurement result has become a hot and difficult problem that needs to be solved urgently in the mid-infrared laser and application fields.

SUMMARY

In order to solve the problem that a detector in a mid-infrared band at present cannot meet a requirement for detecting a mid-infrared ultrafast light signal and realize high-speed real-time sampling and measurement of the mid-infrared ultrafast light signal, the present disclosure provides a high-speed real-time sampling and measuring device and method for a mid-infrared ultrafast light signal based on time domain amplification. A time domain amplification method is used to sample and measure the mid-infrared ultrafast light signal, thus effectively realizing the high-speed real-time sampling and measurement of the mid-infrared ultrafast light signal. Simple principle, compact structure and convenience in debugging are achieved.

The technical solution of the present disclosure is to provide a high-speed real-time sampling and measuring device for a mid-infrared ultrafast light signal, including a time domain amplification unit and a detection unit.

The time domain amplification unit is configured to perform sampling and time domain amplification on received to-be-detected signal light, and may realize fast sampling and high-multiplying-power low-distortion time domain amplification of the mid-infrared ultrafast light signal and convert a light signal of a mid-infrared band into a near-infrared/visible band.

The detection unit is configured to receive and record information of the to-be-detected signal light processed by the time domain amplification unit.

Further, the time domain amplification unit includes a beam combiner, a signal light path and a pump light path which are respectively located in two incident light paths of the beam combiner, and a new frequency light path located in an emergent light path of the beam combiner.

The signal light path includes an attenuator, a first polarization controller and a first dispersive medium which are arranged along the light path. The pump light path includes a pump source, a second polarization controller and a second dispersive medium which are arranged along the light path.

The new frequency light path includes a high-nonlinearity lithium niobate waveguide, a filter and a third dispersive medium which are arranged in sequence along the light path.

In the signal light path, the attenuator is configured to adjust the intensity of the signal light such that the signal light conforms to an intensity condition for generating three-wave mixing. The first polarization controller is configured to adjust the polarization of the signal light such that the signal light conforms to a phase matching condition for generating the three-wave mixing. The first dispersive medium is configured to perform secondary phase modulation on a frequency domain of the signal light.

In the pump light path, the pump source is configured to provide pump light in the three-wave mixing process. The second polarization controller is configured to adjust the polarization of the pump light such that the pump light conforms to the phase matching condition for generating the three-wave mixing. The second dispersive medium is configured to perform the secondary phase modulation on a frequency domain of the pump light.

The beam combiner is configured to combine the signal light output by the signal light path and the pump light output by the pump light path.

The high-nonlinearity lithium niobate waveguide is configured to receive combined light output by the beam combiner and generate a three-wave mixing effect. The filter is configured to filter out the pump light and the signal light output from the high-nonlinearity lithium niobate waveguide to obtain new frequency light generated by the three-wave mixing. The third dispersive medium is configured to perform the secondary phase modulation on a frequency domain of the new frequency light.

Further, in order to ensure that the pump light and the signal light are synchronized on the time domain, the time domain amplification unit further includes a time delay line located in the pump light path or the signal light path and configured to adjust a relative time delay between the pump light and the signal light.

Further, the detection unit includes a real-time oscilloscope and a photoelectric detector. The input end of the photoelectric detector is connected with the output end of the time domain amplification unit. The output end of the photoelectric detector is connected with the real-time oscilloscope.

Further, in order to sample, measure and record information of the ultrafast light signal in real time, the photoelectric detector is a photoelectric detector of the GHz bandwidth. The real-time oscilloscope is a real-time oscilloscope of the GHz bandwidth.

Further, the first dispersive medium, the second dispersive medium and the third dispersive medium are all dispersion-flattened dispersive media having group velocity dispersion, such as single mode fibers and fiber bragg gratings.

The present disclosure further provides a method for realizing high-speed real-time sampling and measurement of a mid-infrared ultrafast light signal based on the above device, including the following steps:

Step I, performing, by a time domain amplification unit, sampling and time domain amplification on signal light incident to the time domain amplification unit, and converting the signal light of a mid-infrared band into a near-infrared/visible band;

Step II, receiving and recording, by a detection unit, information of to-be-detected signal light processed by the time domain amplification unit to realize high-speed real-time sampling and measurement of the mid-infrared ultrafast light signal.

Further, Step I specifically includes:

controlling a pump source to emit pump light; receiving to-be-detected signal light, and adjusting, by an attenuator, the intensity of the signal light; adjusting, by a first polarization controller and a second polarization controller, polarization directions of the signal light and the pump light respectively such that the signal light and the pump light conform to a phase matching condition for generating three-wave mixing; adjusting, by a time delay line, a relative time delay between the pump light and the signal light to ensure that the pump light and the signal light are synchronized on the time domain; performing, by a first dispersive medium and a second dispersive medium, secondary phase modulation on frequency domains of the signal light and the pump light respectively; combining, by a beam combiner, the signal light and the pump light subjected to the secondary phase modulation, and then injecting the combined light into a high-nonlinearity lithium niobate waveguide to generate an efficient three-wave mixing effect; filtering, by a filter, the combined light to output new frequency light generated by the three-wave mixing, and performing, by a third dispersive medium, the secondary phase modulation on a frequency domain of the new frequency light and thus realizing high-multiplying-power low-distortion time domain amplification of the signal light.

The present disclosure has the advantages below:

1. The present disclosure realizes the high-speed real-time sampling and measurement of the mid-infrared ultrafast light signal by using a time domain amplification technology, accurately obtains subpicosecond transient characteristics of the light signal, breaks through the capacity limit to the response rate of a traditional photoelectric detector, the bandwidth of the oscilloscope and the like, and is applicable to femtosecond-level mid-infrared ultrafast light signals.

2. The present disclosure realizes the high-speed real-time sampling and measurement, has time resolution less than or equal to 100 fs and a sampling rate more than or equal to 1 TS/s, and can precisely sample and measure the mid-infrared ultrafast light signal in real time.

3. The sampling and measuring device of the present disclosure is high in detection sensitivity less than or equal to 0.05 nJ, and the sensitivity of real-time sampling and measurement of the mid-infrared ultrafast light signal is greatly improved.

4. Through the present disclosure, the high-multiplying-power low-distortion time domain amplification of the mid-infrared ultrafast light signal can be realized, and converting the signal light of the mid-infrared band to the near-infrared/visible band is favorable for detection and processing.

5. The measuring device of the present disclosure is simple in structure, convenient, practical, low in cost and low in SWaP (size, weight and power consumption), and has the characteristics of high speed, high resolution, instantaneity and the like.

BRIEF DESCRIPTION OF THE DRAWINGS

FIG. 3b is a diagram of sampling and time domain amplification results of FIG. 3a.

Figure 1:
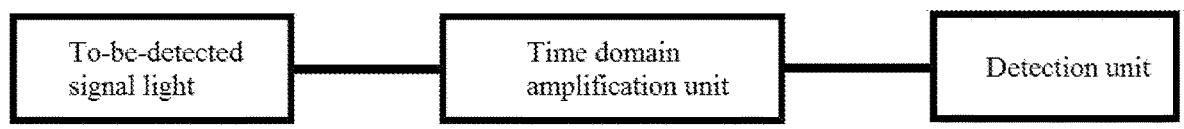
FIG. 1 is a schematic diagram of the present disclosure.

Numerals in the drawings: 1: to-be-detected signal light; 2: attenuator; 3: first polarization controller; 4: first dispersive medium; 5: pump source; 6: time delay line; 7: second polarization controller; 8: second dispersive medium; 9: beam combiner; 10: lithium niobate waveguide; 11: filter; 12: third dispersive medium; 13: detector; 14: real-time oscilloscope; 20: time domain amplification unit; and 30: detection unit.

DETAILED DESCRIPTION OF THE EMBODIMENTS

The present disclosure is further described below in conjunction with the drawings and specific embodiments.

The present disclosure constructs a time domain amplification unit based on an efficient low-threshold three-wave mixing effect in a lithium niobate waveguide to realize high-multiplying-power low-distortion time domain amplification of a mid-infrared ultrafast light signal, and records information of to-be-detected signal light by using a detection unit, thereby realizing high-speed real-time sampling and measurement of the mid-infrared ultrafast light signal.

Figure 2:
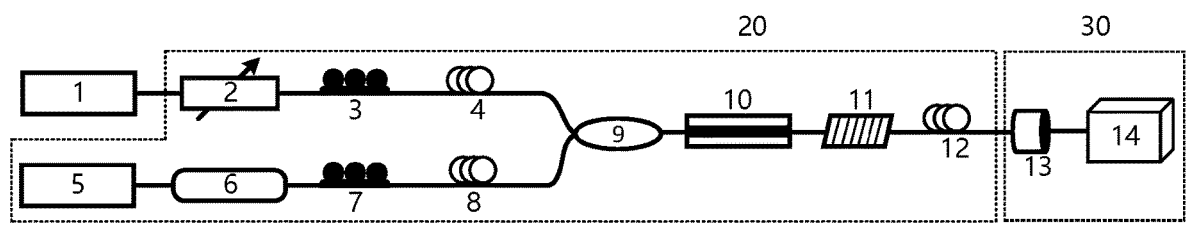
FIG. 2 is a structural schematic diagram of a device in an embodiment of the present disclosure.

Referring to FIG. 1 and FIG. 2, the present embodiment provides a high-speed real-time sampling and measuring device for a mid-infrared ultrafast light signal based on time domain amplification, including a time domain amplification unit 20 configured to perform sampling and time domain amplification on to-be-detected signal light 1, and a detection unit 30 configured to detect data processed by the time domain amplification unit 20.

The time domain amplification unit 20 includes an attenuator 2 configured to adjust the intensity of the signal light, a first dispersive medium 4 configured to perform secondary phase modulation on a frequency domain of the signal light, a pump source 5 configured to provide pump light for a three-wave mixing process, a second dispersive medium 8 configured to perform the secondary phase modulation on a frequency domain of the pump light, a first polarization controller 3 and a second polarization controller 7 which are respectively configured to perform polarization adjustment on the signal light and the pump light, a time delay line 6 configured to adjust a relative time delay between the signal light and the pump light, a beam combiner 9 configured to combine the modulated signal light and pump light, a high-nonlinearity lithium niobate waveguide 10 configured to generate a three-wave mixing effect, a filter 11 configured to filter out the pump light, the signal light and the like to obtain new frequency light generated by the three-wave mixing, and a third dispersive medium 12 configured to perform the secondary phase modulation on a frequency domain of the new frequency light.

In the present embodiment, the attenuator 2, the first polarization controller 3 and the first dispersive medium 4 are arranged in sequence along a light path and located in one incident light path of the beam combiner 9. The pump source 5, the time delay line 6, the second polarization controller 7 and the second dispersive medium 8 are arranged in sequence along a light path and located in another incident light path of the beam combiner 9. The high-nonlinearity lithium niobate waveguide 10, the filter 11 and the third dispersive medium 12 are arranged in sequence along a light path and located in an emergent light path of the beam combiner 9. The to-be-detected signal light 1 entering the time domain amplification unit 20 passes through the attenuator 2, the first polarization controller 3 and the first dispersive medium 4 in sequence to enter the beam combiner 9. The pump light passes through the time delay line 6, the second polarization controller 7 and the second dispersive medium 8 in sequence, and then enters the beam combiner 9. The beam combiner 9 combines the signal light and the pump light emitted from the two incident light paths, and the combined light is output to the detection unit 30 after passing through the high-nonlinearity lithium niobate waveguide 10, the filter 11 and the third dispersive medium 12 in sequence.

The detection unit 30 includes a photoelectric detector 13 for receiving data and a real-time oscilloscope 14. The input end of the photoelectric detector 13 is connected with the output end of the time domain amplification unit 20 to acquire information of the to-be-detected signal light 1. The output end of the photoelectric detector 13 is connected with the input end of the real-time oscilloscope 14. The photoelectric detector 13 is a photoelectric detector 13 of the GHz bandwidth. The real-time oscilloscope 14 is a real-time oscilloscope 14 of the GHz bandwidth.

A high-speed real-time sampling and measuring method for a mid-infrared ultrafast light signal based on time domain amplification is implemented by the following process, including the following steps that:

1) a pump source 5 emits pump light; an attenuator 2 is used to adjust the intensity of signal light entering a time domain amplification unit 20 to enable the signal light to conform to an intensity condition for generating three-wave mixing; a time delay line 6 is used to adjust a relative time delay between the pump light and the signal light in the time domain amplification unit 20 to ensure that the pump light and the signal light are synchronized on the time domain; a second polarization controller 7 and a first polarization controller 3 are respectively used to adjust polarization directions of the pump light and the signal light in the time domain amplification unit 20 such that the pump light and the signal light conform to a phase matching condition for generating the three-wave mixing; a second dispersive medium 8 and a first dispersive medium 4 are respectively used to perform secondary phase modulation on frequency domains of the pump light and the signal light; a beam combiner 9 combines the pump light and the signal light, and then the combined light is injected into a high-nonlinearity lithium niobate waveguide 10 to generate an efficient three-wave mixing effect; a new frequency light generated by the three-wave mixing is obtained after the combined light passes through a filter 11, and a third dispersive medium 12 is used to perform the secondary phase modulation on a frequency domain of the new frequency light and thus realizing high-multiplying-power low-distortion time domain amplification of the signal light;

2) a detection unit 30 is used to record information of the signal light output by the time domain amplification unit 20 in real time to realize high-speed real-time sampling and measurement of the mid-infrared ultrafast light signal.

The present disclosure injects the to-be-detected signal light 1 into the high-speed real-time sampling and measuring device for the mid-infrared ultrafast light signal based on the time domain amplification, and uses the detection unit 30 to record the information of the to-be-detected signal light 1, thus realizing the high-speed real-time sampling and measurement of the mid-infrared ultrafast light signal.

The working principle of the present disclosure is as follows:

In the time domain amplification unit, the two polarization controllers are used to adjust the polarization directions of the pump light and the signal light respectively such that the pump light and the signal light conform to the phase matching condition for generating the three-wave mixing. The time delay line is used to adjust the relative time delay between the pump light and the signal light to ensure that the pump light and the signal light are synchronized on the time domain. The attenuator is used to adjust the intensity of the signal light such that the signal light conforms to the intensity condition for generating the three-wave mixing. The dispersive mediums are respectively used to perform the secondary phase modulation (namely linear chirp introduced to the pump light as well as time domain broadening of the signal light, and input dispersion serving for a time domain amplification system) on the frequency domains of the pump light and the signal light. The beam combiner combines the pump light and the signal light, and then the combined light is injected into the lithium niobate waveguide to generate the efficient three-wave mixing effect (conforming to energy conservation and momentum conservation conditions). The new frequency light generated by the three-wave mixing is obtained after the combined light passes through the filter, and the dispersive medium is used to perform the secondary phase modulation (output dispersion serving for a time domain amplification system) on the frequency domain of the new frequency light and thus realizing the high-multiplying-power low-distortion time domain amplification of the signal light. The detection unit is used to record the information of the signal light output by the time domain amplification unit in real time to realize high-speed real-time sampling and measurement of the mid-infrared ultrafast light signal.

Figure 3A:
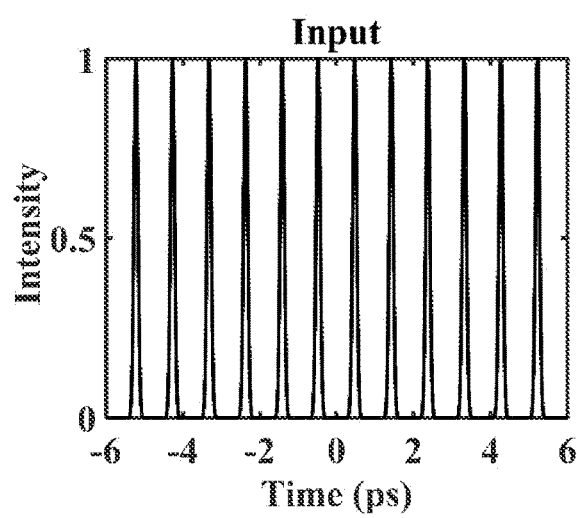
FIG. 3a is an input signal diagram of the present disclosure.
Figure 3B:
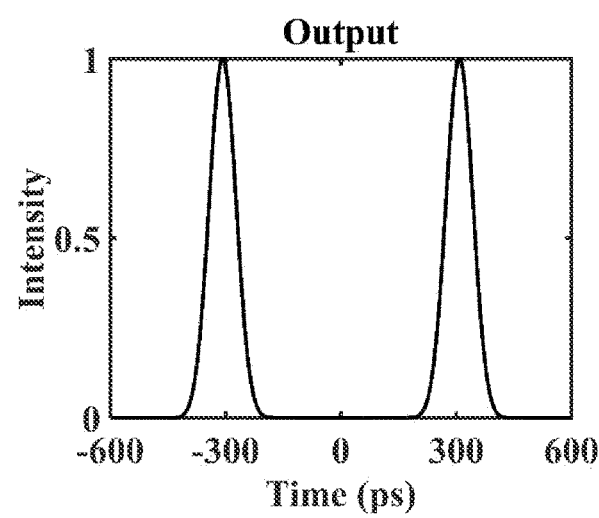

Referring to FIG. 3a and FIG. 3b, sampling and time domain amplification results are illustrated. The high-multiplying-power low-distortion time domain amplification of the mid-infrared ultrafast light signal can be realized by the time domain amplification technology. Therefore, low-distortion time domain amplification more than 600 times can be realized by the time domain amplification method, and thus the high-speed real-time sampling and measurement of the mid-infrared ultrafast light signal are realized by the oscilloscope and the photoelectric detector of the GHz bandwidth.

The invention claimed is:

1. A sampling and measuring device for a mid-infrared ultrafast light signal, comprising a time domain amplification unit and a detection unit, wherein the time domain amplification unit is configured to perform sampling and time domain amplification on received to-be-detected signal light, and to convert a signal light of a mid-infrared band into a near-infrared/visible band;

the detection unit is configured to receive and record information of the to-be-detected signal light processed by the time domain amplification unit, wherein the time domain amplification unit comprises a beam combiner, a signal light path and a pump light path that are respectively located in two incident light paths of the beam combiner, and a new frequency light path located in an emergent light path of the beam combiner;

wherein the signal light path comprises an attenuator, a first polarization controller, and a first dispersive medium that are arranged along the light path;

wherein the pump light path comprises a pump source, a second polarization controller, and a second dispersive medium that are arranged along the light path;

wherein the new frequency light path comprises a lithium niobate waveguide, a filter, and a third dispersive medium that are arranged in sequence along the light path;

wherein, in the signal light path, the attenuator is configured to adjust an intensity of the signal light so that the signal light conforms to an intensity condition for generating a three-wave mixing; the first polarization controller is configured to adjust the polarization of the signal light so that the signal light conforms to a phase matching condition for generating the three-wave mixing; and the first dispersive medium is configured to perform a secondary phase modulation on a frequency domain of the signal light;

wherein, in the pump light path, the pump source is configured to provide pump light in the three-wave mixing process; the second polarization controller is configured to adjust the polarization of the pump light so that the pump light conforms to the phase matching condition for generating the three-wave mixing; and the second dispersive medium is configured to perform the secondary phase modulation on a frequency domain of the pump light;

wherein the beam combiner is configured to combine a signal light output by the signal light path and a pump light output by the pump light path; and wherein the lithium niobate waveguide is configured to receive combined light output by the beam combiner and generate a three-wave mixing effect the filter is configured to filter out the pump light and the signal light output from the lithium niobate waveguide to obtain new frequency light generated by the three-wave mixing; and the third dispersive medium is configured to perform the secondary phase modulation on a frequency domain of the new frequency light.

2. The sampling and measuring device for the mid-infrared ultrafast light signal according to claim 1, wherein the time domain amplification unit further comprises a time delay line located in the pump light path or the signal light path and configured to adjust the pump light and the signal light to be synchronized on the time domain.

3. The sampling and measuring device for the mid-infrared ultrafast light signal according to claim 2, wherein the detection unit comprises a real-time oscilloscope and a photoelectric detector, an input end of the photoelectric detector is connected with an output end of the time domain amplification unit, and the output end of the photoelectric detector is connected with the real-time oscilloscope.

4. The sampling and measuring device for the mid-infrared ultrafast light signal according to claim 3, wherein the photoelectric detector is a photoelectric detector of GHz bandwidth, and the real-time oscilloscope is a real-time oscilloscope of GHz bandwidth.

5. The sampling and measuring device for the mid-infrared ultrafast light signal according to claim 4, wherein the first dispersive medium, the second dispersive medium and the third dispersive medium are all single mode fibers, and have different dispersion sizes.

* * * * *